US008688695B2

(12) United States Patent
Kapoor et al.

(10) Patent No.: US 8,688,695 B2
(45) Date of Patent: Apr. 1, 2014

(54) COMPUTERIZED SEARCHABLE DOCUMENT REPOSITORY USING SEPARATE METADATA AND CONTENT STORES AND FULL TEXT INDEXES

(75) Inventors: Rahul Kapoor, Bellevue, WA (US); Sameer H. Ranade, Maharashtra, IN (US); Sherif M. Botros, Redwood City, CA (US)

(73) Assignee: Mimosa Systems, Inc., Mountain View, CA (US)

( * ) Notice: Subject to any disclaimer, the term of this patent is extended or adjusted under 35 U.S.C. 154(b) by 348 days.

(21) Appl. No.: 13/116,763

(22) Filed: May 26, 2011

(65) Prior Publication Data
US 2012/0303632 A1   Nov. 29, 2012

(51) Int. Cl.
*G06F 7/00*   (2006.01)

(52) U.S. Cl.
USPC .......................................... 707/726; 707/831

(58) Field of Classification Search
USPC ................. 707/707, 726, 800, 696, 711, 715, 707/739–745, 830, 831, 765–768, 707/713–719; 386/331
See application file for complete search history.

(56) References Cited

U.S. PATENT DOCUMENTS

| 2002/0107973 | A1* | 8/2002 | Lennon et al. | 709/231 |
| 2007/0055689 | A1* | 3/2007 | Rhoads et al. | 707/102 |
| 2010/0070448 | A1* | 3/2010 | Omoigui | 706/47 |
| 2010/0161616 | A1* | 6/2010 | Mitchell | 707/741 |

* cited by examiner

*Primary Examiner* — James Trujillo
*Assistant Examiner* — Linh Black

(57) ABSTRACT

A computerized searchable repository stores documents as structured metadata parts and unstructured content parts using single instancing. A full text index used for keyword searching includes a metadata index and a content index. A linking structure includes metadata-to-content (MD to CT) links and content-to-metadata (CT to MD) linking entries, with each MD to CT link linking a metadata part of a document to each content part of the document, and each CT to MD linking entry having one or more CT to MD links collectively linking a content part to the metadata parts of the documents that include the content part. Indexing includes metadata indexing a metadata part, conditionally content indexing a content part, and updating the linking structure. Content indexing is performed only if the content part does not match a content part already stored and indexed. Index entries each associate a key word or key value with corresponding metadata or content parts containing the key word or key value. Updating the linking structure includes generating new MD to CT and CT to MD links between the metadata part and either the new content part or an existing matching content part if present.

22 Claims, 3 Drawing Sheets

COMPUTERIZED SEARCHABLE DOCUMENT REPOSITORY USING SEPARATE METADATA AND CONTENT STORES AND FULL TEXT INDEXES

BACKGROUND

An information management platform may support a variety of document-related functions such as archiving, data protection and electronic discovery, and for these purposes such a platform may employ a searchable document repository. Document repositories generally track documents from different data sources (e.g., electronic mail, a file system, or shared document locations such as SharePoint or Confluence). Regardless of the source, documents can in general be thought of as comprising structured attributes (or "metadata") and unstructured content. An email for example has structured attributes like Sent Time, Sent By, and Sent To, along with unstructured content like the body of the email (message) or attachments to the email. Searches on the repository can be directed to the structured attributes, the unstructured content, or both (so-called mixed searches).

In one traditional architecture for document repositories, structured attributes are stored in a database and the unstructured content is stored in a conventional file system. The content is indexed using a full text engine to make it searchable. Many modern databases (like SQL Server or Oracle) provide full text engines. Additionally, there are standalone full text engines such as Lucene, FAST and dtSearch. In the traditional architecture, metadata-only searches are served by the database alone. A content search requires use of the full text indexes and augmenting the results via a database "join" operation to pass back the metadata attributes of the qualifying documents. Mixed searches require both a search on the database for the structured metadata part and a search on full text indexes for the content part, followed by an intersection of the results done via "joins" in the database.

It is known to utilize so-called "single instancing" of content, such that identical content appearing in multiple distinct documents is stored and indexed only once. As an example, an email with an attachment may be sent to 100 recipients whose documents are tracked in a document repository. The repository saves the emails as 101 logical documents (one for each recipient and one for the sender), but with content single instancing, the body and attachment (which are the same for all 101 copies) are stored only once and indexed only once, and the single instance of the body and attachment are linked to the 101 logically separate documents.

SUMMARY

There are drawbacks to the traditional model of searchable document repositories of the type discussed above. One drawback is the reliance on the database and the compute-intensive "join" operation needed for searches. Database licenses are expensive, as is database storage. Additionally, for searches to work without being blocked by ingestion processes needing access to the same metadata, the metadata needed for searches is typically duplicated so that overall storage costs are increased. It would be desirable to reduce or eliminate such dependence on the use of a database for searches while still supporting single-instancing indexed content.

Because metadata is rarely identical across documents, while content commonly is, one good organization to support single instancing at the content level may be to keep content indexes separate from metadata indexes and to link the two. So for an email for example, structured fields can be indexed in a metadata index, and body/attachments can be indexed as part of a separate content index. Metadata and content when passed to a full text engine are treated as separate items, referred to herein as "parts". These parts are linked together by a linking structure. In one aspect, the linking structure links the metadata part of each document (e.g., structured attributes of an email) to the content part(s) of the document (e.g., body/attachment), so that when searching metadata first the content search can be pruned to only the content parts satisfying the metadata search criteria. The linking structure also links each content part to all the documents in which the content part occurs, using a pointer to the metadata part of each such document.

The metadata-to-content linking is established once upon indexing a new document, and thus these links can be implemented advantageously as part of the metadata part or metadata index. This is not a desirable option for the content-to-metadata linking because of its dynamic nature (i.e., the general possibility that an already-indexed content part will also be included in a new incoming document). Generally, full text indexes are not updated in real time, and thus it would be disadvantageous to maintain the content-to-metadata links in the document indexes. Generally, the content-to-metadata structure should provide for efficient searches, be persistent, and not use a lot of storage or memory. Several approaches are described herein. Using the disclosed layout of indexes and linking structures, searches can be performed using full text indexes only, eliminating the need for an expensive database while providing the benefits of single instancing of content.

Thus, a computerized searchable repository for documents is disclosed in which each document has a structured metadata part and one or more unstructured content parts. A storage sub-system of the repository is operative to store the documents, a full text index and a linking structure, with the content parts of the documents being stored in a single-instanced manner avoiding replication of identical content parts. The full text index is usable for keyword searching of the documents and includes a metadata index and a content index of the metadata and content parts of the documents. The linking structure includes metadata-to-content links and content-to-metadata linking entries, with each metadata-to-content link linking a metadata part of a document to each content part of the document, and each content-to-metadata linking entry having one or more content-to-metadata links collectively linking a content part to the metadata parts of a group of documents that each include the content part.

Processing circuitry of the computerized searchable repository is operative to perform full text indexing of the documents in the storage sub-system, with the full text indexing of each document including metadata indexing a metadata part, conditionally content indexing a content part, and updating the linking structure. Due to the single-instancing, the content indexing is performed only if the content part is a new content part not matching any of at least a set of content parts already stored in the content store and indexed in the content index. Each of the metadata indexing and content indexing includes generating new index entries in the metadata or content index respectively for the metadata or content part, with each index entry associating a key word or key value with a corresponding one or more metadata or content parts containing the key word or key value. Updating the linking structure includes generating new metadata-to-content and content-to-metadata links between the metadata part and either the new content part or an existing matching content part if present.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
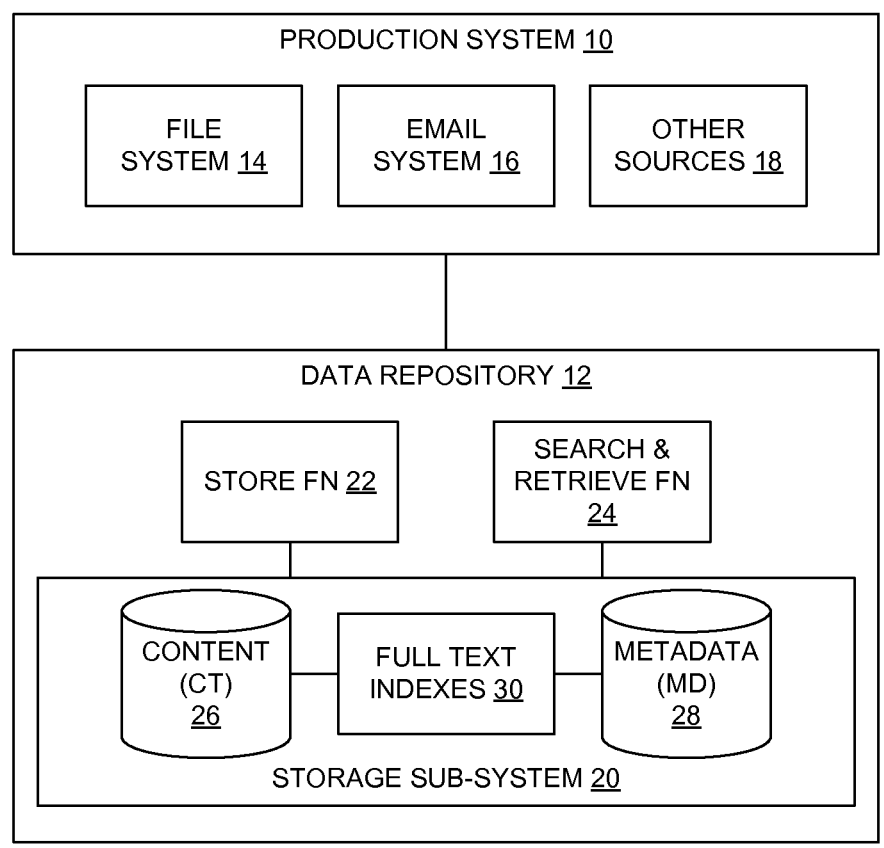
FIG. 1 is a block diagram of a data processing system including a computerized searchable data repository.

FIG. 1 shows a data processing system including a production system 10 and a searchable document repository shown as a data repository 12. The production system 10 may be a typical data processing system including computers, storage devices and other devices connected together by one or more networks, used to carry out computing tasks for users (who may be internal to an organization or external users such as customers accessing the production system 10 via a public network). As shown, the production system 10 includes a variety of sources of electronic documents including a file system 14, electronic mail (email) system 16, and other sources 18. The documents are stored within the production system 10 during a typically prolonged period of active use.

The data repository 12 is used to store the documents from the production system 10 for any of a variety of special purposes typically unrelated to production uses. One example is for long-term archiving of documents. Another example is auditing or forensic investigation. The data repository 12 includes a storage sub-system 20 for document storage, a store function (STORE FN) 22 that transfers documents from the production system 10 into the data repository 12, and a search and retrieve function (SEARCH & RETRIEVE FN) 24 that provides an ability to search for documents in the data repository 12 and to retrieve documents from the data repository 12 so that they can be provided to a user of the data repository 12.

As shown, the storage sub-system 20 includes two separate stores, a content (CT) store 26 and a metadata (MD) store 28. Each document stored in the data repository 12 includes a structured part referred to as "metadata" (or MD) and one or more unstructured parts referred to as "content" (or CT), and these different parts are stored in the metadata store 28 and content store 26 respectively. The unstructured content is typically the text or other user-created content of a file, email message or other document, whereas the structured metadata includes particular attributes of the documents (which may be system-assigned). An email for example typically has structured attributes like Sent Time, Sent By, and Sent To, as well as unstructured content like the body (message) of the email or attachments. A file from the file system 14 will typically have file content such as text and embedded objects, as well as structured attributes such as file name, Last Modified date, etc. Searches on the items in the data repository 12 can specify content (e.g., items including the term "Red Sox"), metadata (e.g., items created in the month of May, 2011) or both (mixed searches).

The storage sub-system 20 also stores a set of full text indexes 30 of the metadata and content stores 26, 28, the indexes 30 being used by the search and retrieval function 24 to carry out searches. In operation, the store function 22 is responsible for storing documents into the content and metadata stores 26, 28 and for creating index entries in the full text indexes 30 for the documents to enable the stored documents to be located on search. Details of these operations are provided below.

Figure 2:
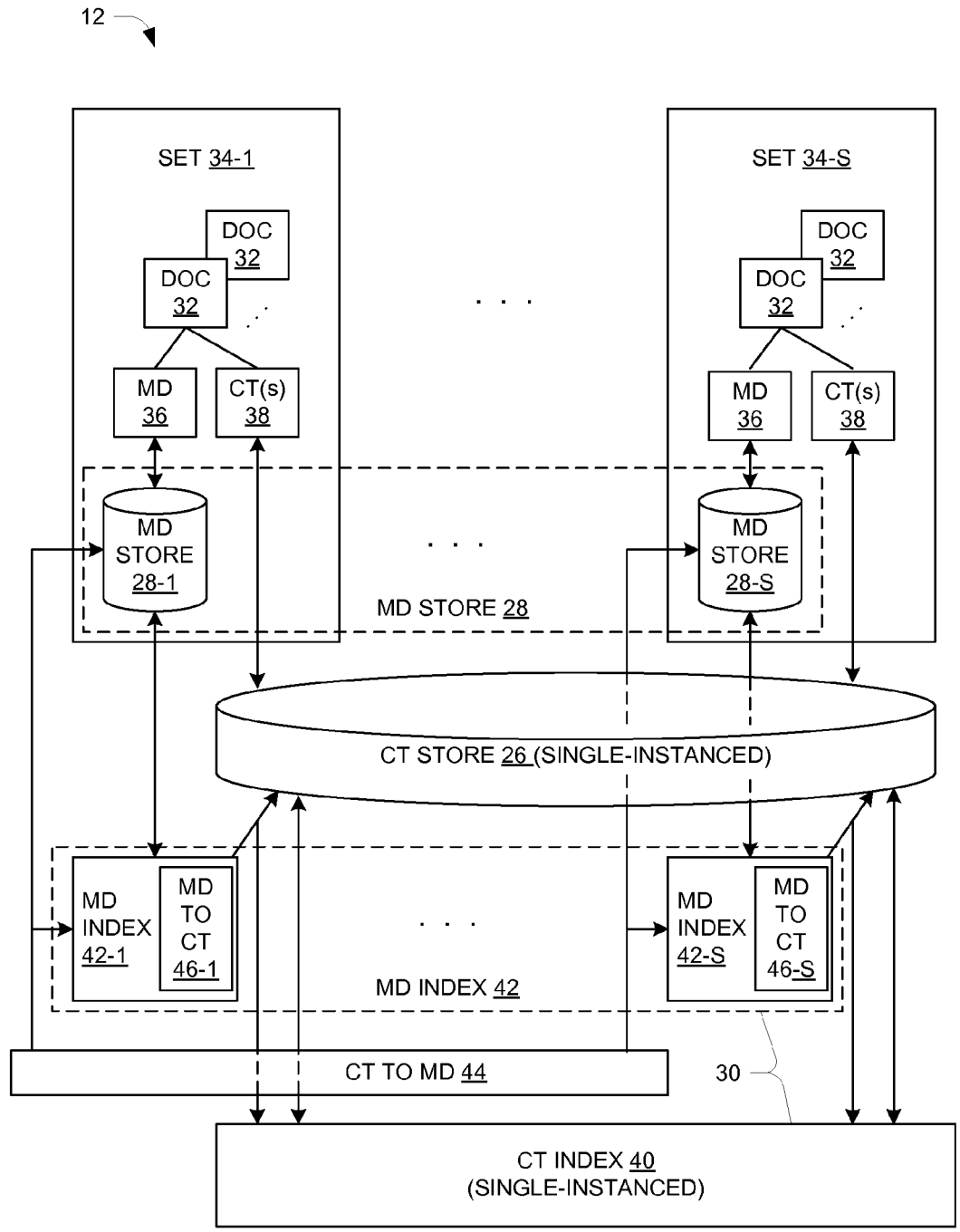
FIG. 2 is a block diagram showing an organization of the searchable data repository.

FIG. 2 shows the data repository 12 in additional detail. The organization reflects an organization of production documents 32 of the production system 10 into collections or groups shown as "sets" 34-1, ..., 34-S. In one example, a set 34 may correspond to an individual email file (e.g., a "personal storage table" or PST file), which generally includes a number of individual email messages as documents 32. A set 34 may also be other organizations such as a directory from the file system 14, a content repository like SharePoint (e.g., Confluence), or other groupings of documents 32 that occur in the production system 10. Other examples include hosted email (e.g., Gmail, Yahoo mail, Exchange online), hosted document management systems (e.g., Office 365, Google Documents), databases (e.g., SQL Server), enterprise resource planning/customer relationship management (ERP/CRM) systems (e.g., SAP R3, Microsoft Dynamics), instant messaging content, etc. In general the disclosed techniques may be applicable to any kind of content that needs to be protected.

As shown, each document 32 includes both a metadata (MD) part 36 and one or more content (CT) parts 38. The content parts 38 from all sets 34 are stored in a shared content (CT) store 26, which is "single-instanced" as described in more detail below. The metadata store 28 of FIG. 1 is divided into a number of individual MD stores 28-1, ..., 28-S, each storing the MD part 36 of each document 32 of the corresponding set 34-1, ..., 34-S. The full text indexes 30 are shown as including a content (CT) index 40 and a set of metadata (MD) indexes 42-1, ..., 42-S corresponding to the sets 34-1, ..., 34-S. Also shown are linking structures that provide desired linking between metadata and content parts 36, 38 for both searching and retrieval. The linking structures include a "content to metadata" (CT to MD) structure 44 as well as a "metadata to content" (MD to CT) structure 46, the latter being divided into portions 46-1, ..., 46-S for the different sets 34 as shown. In the illustrated configuration, each MD to CT portion 46-x is included within a corresponding MD index 42-x.

As indicated above, the content store 26 employs a technique referred to as "single instancing", meaning that any content part 38 that is common to two or more documents 32 is stored only once rather than being stored once per individual document 32 that it constitutes. In the event that there is a significant degree of replication of content among the documents 32, single instancing can reduce storage requirements and provide other benefits, including more efficient storage and operation of the CT index 40. When using single instancing it is also necessary to store a reference from each CT part 38 to all the documents 32 that contain the CT part 38, and to account for the replication in the structure and functioning of the indexes 40, 42 as well. These details are described below.

As an example of single instancing, suppose an email includes a message body and a file as an attachment, and it is sent to 100 recipients whose documents are tracked within the data repository 12. In this case there will be 101 documents 32 which are the different copies of the email (one of the sender and one of each recipient), and the same number (101) of MD parts 36 (one for each copy of the email) will be created in the MD stores 28. However, the body and attachment, which are the same for each copy of the email, are each stored in the content store 26 only once and indexed in the CT index 40 only once, along with references to the MD parts 36 for the 101 email documents 32 that include that same body and attachment. It will be appreciated that this organization can save both storage and operations for replicated content.

It should be noted that single-instancing may have a scope smaller than the entire contents of the CT store 26. For example, it may be desirable to single-instance only within a given set 34, in which case there will generally be the possibility of replicated content parts 38 for documents of different sets 34. Generally, a content part 38 is indexed only if it is a new content part not matching any of at least some set of content parts already stored in the content store 26 and indexed in the CT index 40.

The indexes 40 and 42 may be of the type generally known in the art as "inverted" full text indexes, each generally including entries for a large number of keywords or key values (e.g., dates) that appear in the documents being indexed. Each index associates each keyword or key value with a list of documents that contain the keyword or key value. The CT index 40 associates each keyword or key value with one or more single-instanced CT parts 38 in the CT store 26, while the MD index 42 of each set 34 associates a key word or key value with the MD part 36 of one or more documents 32 of the set. Continuing with the above example of the term "Red Sox", the CT index 40 would include an entry for "Red Sox" and an identifier of each unique CT part 38 that includes that term. For example, if both the message body and an attached file of an email include the term "Red Sox", then the CT index 40 would include an entry associating the term "Red Sox" with both the message body and the attached file as respective CT parts 38.

Figure 3A:
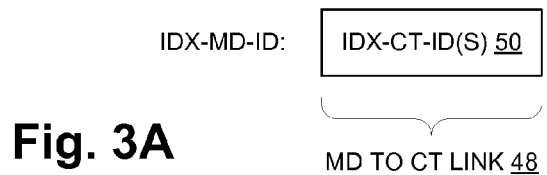
FIGS. 3A and 3B depict data items serving to link metadata and content parts of documents.

FIG. 3A shows an entry of the MD to CT structure 46, denoted an MD to CT link 48. The MD to CT structure 46 of each set 34 is logically a linear array of links 48 indexed by a value IDX-MD-ID that uniquely identifies particular indexed metadata within the full text index 30. It is noted that the term "indexed" in this context refers to the enumeration or identification of elements of an array, as known to those skilled in the art, as distinct from the above-described keyword or key-value indexing of a document 32. The link 48 includes one or more values shown as IDX-CT-ID 50, each uniquely identifying particular indexed content within the full text index 30. Each MD to CT link 48 establishes a link from a particular indexed metadata identifier to a corresponding indexed content identifier. Continuing with the above example of an email having two attachments, the MD to CT link 48 for that email would have an array index value IDX-MD-ID that identifies the indexed MD of the email, and it would include two distinct IDX-CT-IDs 50, one identifying the indexed message body and the other identifying the indexed attachment as respective indexed content. Additionally, continuing with the example of an email sent to 100 recipients and assuming each set 34 corresponds to an individual user's email file, then there would be an identical link 48 in the MD to CT structure 46 of each set 34, one for each copy of the email and each having a respective array index value IDX-MD-ID corresponding to the indexed metadata of the copy of the email in the respective set 34.

Figure 3B:
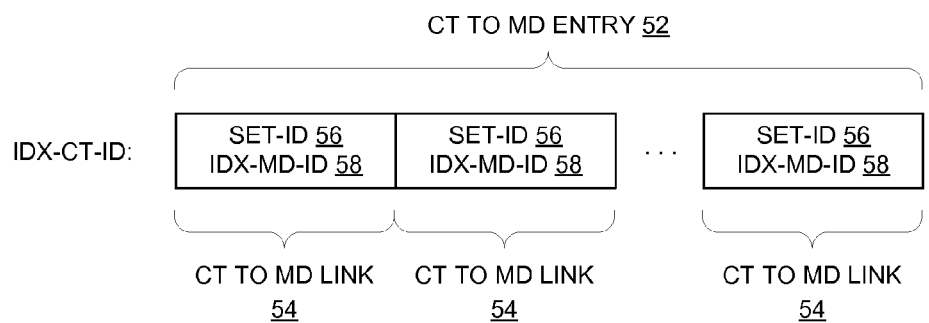

FIG. 3B shows an entry of the CT to MD structure 44, denoted a CT to MD entry 52. The CT to MD structure 44 is logically a linear array of entries 52 whose array index is the value IDX-CT-ID (as described above) that uniquely identifies particular indexed content within the full text index 30. The entry 52 includes one or more individual links, shown as CT to MD links 54, each being a pair of values shown as SET-ID 56 and IDX-MD-ID 58 which together uniquely identify particular indexed metadata within the full text index 30. Each CT to MD entry 52 establishes a set of links from single-instanced indexed content to corresponding indexed metadata of each of potentially multiple documents 32 that includes the indexed content. Continuing with the above example of an email having two attachments, there would be two distinct CT to MD entries 52, one for the message body and one for the attached file. The SET-ID 56 of each entry 52 would identify the set 34 (i.e., email file) where the email is located, and the IDX-MD-ID 58 of each entry 52 would identify the indexed metadata entry for the email of the identified set 34. To appreciate the effect of single-instancing, if this email had been sent to 100 recipients as in the above example, then each entry 52 would include 101 links 54, each identifying a respective set (email file) 34 and indexed metadata of a respective copy of the email.

It is useful to note one distinction between the MD to CT structure 46 (with entries 48 per FIG. 3A) and the CT to MD structure 44 (with entries 52 per FIG. 3B). An MD to CT link 48 needs to be created and added to the MD to CT structure 46 once, when a document 32 is first added to the storage subsystem 20 and indexed. Thus it can be beneficial to include the MD to CT structure 46 within the MD index 42 as described herein. Additionally, each MD to CT link 48 can actually be treated as a searchable attribute of the corresponding MD part 36 and thus be indexed in the MD index 42 along with other searchable attributes. However, a CT to MD entry 52 generally needs to be updated multiple times—each time of adding a new document 32 that has a CT part 38 already stored in the CT store 26 and indexed in the CT index 40. Thus it is not beneficial to store the CT to MD structure 44 as part of the CT index 40, as this would require excessive updating of the CT index 40.

Additionally, both the dynamic nature of the CT to MD structure 44 and other aspects can make it challenging to implement, for example to achieve a desirable degree of storage efficiency as well as desirable performance (search efficiency). Several considerations and alternatives for the CT to MD structure 44 and CT to MD entries 52 are now described.

Figure 4:
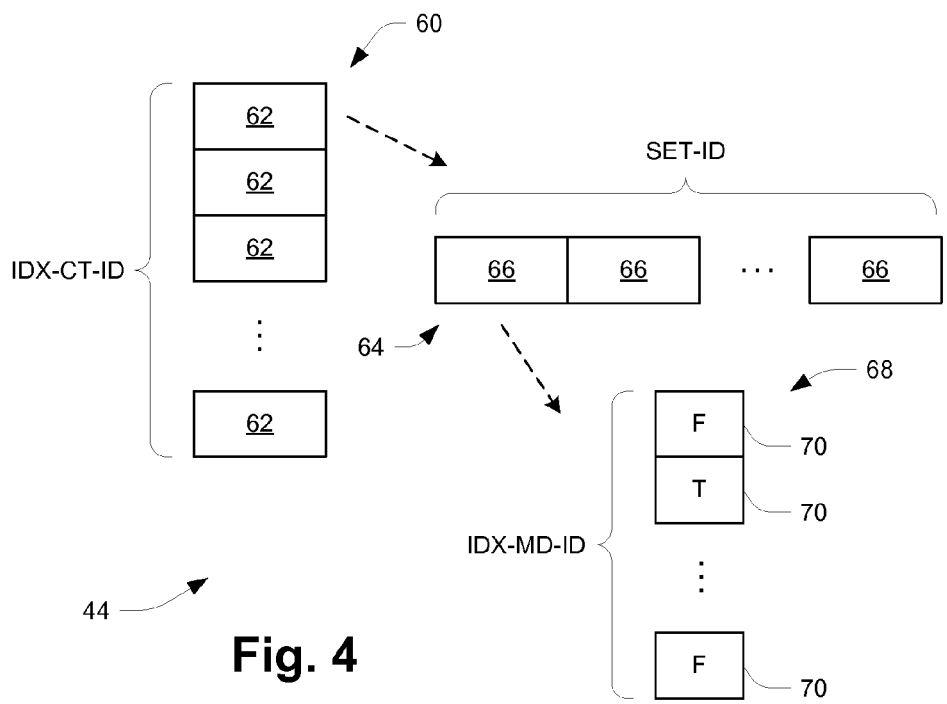
FIG. 4 depicts an organization of a content-to-metadata linking structure.

FIG. 4 presents both a functional view as well as a potential actual organization of the CT to MD structure 44. This representation employs a three-dimensional array as follows:

1. A first sub-array 60 of entries 62 indexed by IDX-CT-ID, each entry 62 pointing to an entry of a second sub-array 64.
2. The second sub-array 64 of entries 66 indexed by SET-ID, each entry 66 being either a null value or pointing to an entry of a third sub-array 68. A null value indicates that there is no link to the set 34 identified by the value of SET-ID of the entry 66.
3. The third sub-array 68 of entries 70 indexed by IDX-MD-ID, each entry 70 being a binary value (shown as "F" and "T") indicating the presence or absence of a link to the MD part 36 identified by the corresponding value of IDX-MD-ID.

Overall, the structure of FIG. 4 allows for efficiently identifying the sets 34 and particular documents 32 within those sets 34 that a given CT part 38 forms part of. A structure like this could actually be used in practice. However, if the degree of replication of CT parts 38 across different documents 32 is generally small, then this structure will be relatively sparse (small proportion of "T" versus "F" entries 70) and thus inefficient from a storage perspective.

Another approach could be to use linked lists instead of arrays. Referring to FIG. 3B, for example, each entry 52 could be implemented as a linked list of the individual links 54. This kind of structure would be storage efficient but inefficient from an access and performance perspective—for replicated CT parts 38 it is required to perform several memory accesses to gather all the links 54, congesting a memory access path and causing a corresponding performance degradation. It may be possible to use a dynamic approach using both linked lists and arrays, changing from one to the other if a certain threshold of entries is crossed (i.e. use linked lists if the number of entries is smaller than the threshold, and use arrays if the threshold is exceeded). Alternative data structures could use a range-partitioned array or a hash bucket or a binary tree (B-tree) for an array level used for searches (fast and reasonably efficient), and linked lists for an array level where results are returned.

It can also be observed that in many cases searches are "scoped" or limited in some fashion that can be exploited for greater efficiency and/or performance. For example, a search may be limited to the email files (or file system files) of a particular user or set of users. Such a limitation on search scope corresponds to selection of particular sets 34. Thus it may be beneficial for the CT to MD structure 44 to be organized accordingly, namely to use a first level indexed by SET-ID rather than IDX-CT-ID. Referring to FIG. 4, such a structure might be a "pivoted" version of the illustrated structure, in which each entry 66 of the array 64 points to an array 60, and each entry 62 of the array 60 points to an array 68. This structure might allow for more efficiently locating the documents 32 in which a CT part 38 occurs within one or more identified sets 34. It may be possible to even further optimize the structure for memory efficiency by tracking just the IDX-CT-ID to IDX-MD-ID in a tabular map per set 34 with a binary tree on top of the map and indexed by IDX-CT-ID. This structure is similar to a table in a relational database with a clustered index on IDX-CT-ID.

Referring back to FIG. 2, with the illustrated organization of the indexes 30 and linking structures 44, 46, metadata-only searches can be served by the MD indexes 42 alone. Content-only searches require searching the CT index 40 and then getting the metadata attributes for the qualifying documents by using the CT to MD structure 44 to identify the MD parts 36 of the documents 32 within the sets 34 in which the qualifying CT parts 38 occur. Mixed searches can be done in either a metadata-first or content-first manner, depending on which part of the search predicate is expected to be more selective. A metadata-first strategy would generate a list of IDX-MD-IDs and a list of CT parts 38 to search using the MD to CT structure 46. The content part of the search can then be scoped to the list of IDX-CT-IDs generated by the MD to CT structure 46 (note that full text search engines typically have mechanisms to do this scoping efficiently by passing bitmap filters). For the CT parts 38 which match the content predicate, a lookup in the CT to MD structure 44 will return the final qualifying MD parts 36, and a second access to the MD index 42 will return the results with the documents' metadata attributes. A content-first strategy for mixed searches would work similar to content-only searches and avoid two accesses to the MD indexes 42, at the expense of a broad first search in the CT index 40 (as opposed to a scoped search).

Query Splitting

Given that parts of a document (e.g., subject, body and attachments of an e-mail) are indexed as separate documents, there is a potential problem with AND queries over the entire document. For example, a query may specify all e-mail messages having 'Cat' AND NOT 'Dog'. If a message's body has 'Cat' and no 'Dog' while one of the attachment has 'Dog' in it, such a message could erroneously be deemed to meet the search criterion, based on the match for message body along. Such a match would be erroneous because the user's expectation is for the query condition apply to the entire e-mail, not to just one individual part. Similarly, the search 'Cat' AND 'Dog' should qualify a document if any part of it has 'Cat' and some other part has 'Dog'. A search for 'Cat' and 'Dog' in each part will miss out the cases in which 'Cat' and 'Dog' both occur but in different parts.

To address such issues, separate searches can be done on document parts and the user may be expected to perform Boolean logic that is required to get to the semantics as if the search was being performed over a logical document. In this particular example the steps would be:
1. 1st search: Search for just the keyword 'Cat' and tag all results with Tag1
2. 2nd search: Search for just the keyword 'Dog' and tag all results with Tag2
3. 3rd search: This search gives the final results.
   a. For 'Cat' AND NOT 'Dog'. No keyword, include results with Tag1 while excluding results with Tag2.
   b. For 'Cat' AND 'Dog'. No keyword, include results with Tag1 intersected with results for Tag2.

An alternate model is to just expose the search results at a document part level. In this model. the message body and attachments are considered separate documents and returned as such. So in the 'Cat' AND NOT 'Dog' example above if the body had 'Cat' but no 'Dog', the body would be returned, while the attachment which had 'Dog' wouldn't (as wouldn't the other attachments because they didn't have 'Cat'). To clarify this model let's take a more interesting example of an e-mail message M with attachments A1, A2, with 'Cat' in A1 and 'Dog' in A2. In this alternate model 'Cat' AND 'Dog' would return nothing while the query 'Cat' AND NOT 'Dog' would return A1. With a model of treating the message as a single document 'Cat AND Dog' query in this example should return the message M, while 'Cat AND NOT Dog' should exclude M. However, the straightforward search for 'Cat' AND 'Dog' will return nothing while 'Cat' AND NOT 'Dog' will return M, which are both erroneous as they don't match the expected semantics.

To get correct results for searches performed on the entire document with parts indexed as separate documents, a technique called "query expansion" can be used. The query 'Cat AND NOT Dog' would be converted to the following:

[('Cat' in Body) or ('Cat' in A1) or ('Cat' in A2)] and NOT [('Dog' in Body) or ('Dog' in A1) or ('Dog' in A2)]

which, if the NOT is pushed inside the brackets, is the same as:

[('Cat' in Body) or ('Cat' in A1) or ('Cat' in A2)] and [('Dog' not in Body) and ('Dog' not in A1) and ('Dog' not in A2)].

The expanded query would need to be run in the scope of each document. So it is necessary to separate out AND queries into separate queries on each document part and do the intersection internally before passing back results. Queries which have OR at the top level with AND operations at the lower level would need to be normalized to pull the AND to the top for example.

Condition A or (Condition B and Condition C) would need to be normalized to:

(Condition A or Condition B) and (Condition A or Condition C)

The normalization and multiple searches may add to the cost of search in some cases, and thus in some instances it may make sense to expose search results at a document part level as the default and allow for searches on the "composite" document as an option.

The advantage of a complete solution over the above-described "tag" approach would be that for end users the correct results are returned in one search instead of multiple searches (even though multiple searches may be done internally) and customers may not have to rewrite existing queries.

The advantage of a complete solution over the model of returning document parts is that semantics of treating an email as a single document are preserved unless the search is restricted to specific parts, and it is not necessary to deal with issues like the 'Subject' being indexed as a separate document but unlike the body and attachments may not be meaningful to expose as an explicit document part for search results.

The advantage of a complete solution over the model of not allowing searches in document parts is the flexibility to restrict searches to parts of a document and the benefits of improved content single instancing by indexing document parts separately.

While various embodiments of the invention have been particularly shown and described, it will be understood by those skilled in the art that various changes in form and details may be made therein without departing from the spirit and scope of the invention as defined by the appended claims.

What is claimed is:

1. A computerized searchable repository for documents, each document having a structured metadata part and one or more unstructured content parts, comprising:
   a storage device to store the documents, a full text index and a linking structure, the content parts of the documents being stored in a single-instanced manner to avoid storing duplication of identical content parts, the full text index being usable for keyword searching of the documents and including a metadata index and a content index of the metadata and content parts respectively of the documents, the linking structure including metadata-to-content links and content-to-metadata linking entries, each metadata-to-content link linking a metadata part of a respective document to each content part of the document, each content-to-metadata linking entry having one or more content-to-metadata links collectively linking a respective content part to the metadata parts of a group of documents that each include the content part; and
   a processor to perform full text indexing of the documents in the storage device, the full text indexing of each document including metadata indexing a metadata part, conditionally content indexing a content part, and updating the linking structure, the content indexing being performed only if the content part is a new content part not matching any of at least a set of content parts already stored in a content store and indexed in the content index, each of the metadata indexing and content indexing including generating new index entries in the metadata or content index respectively for the metadata or content part respectively, each index entry associating a respective key word or key value with a corresponding one or more metadata or content parts containing the key word or key value, and the updating of the linking structure including generating new metadata-to-content and content-to-metadata links between the metadata part and either the new content part or an existing matching content part if present.

2. A computerized searchable repository according to claim 1, wherein the documents are organized into sets in the storage device, and wherein:
   the content index is a single content index including index entries for content parts of all the documents, and the metadata index includes a plurality of metadata indexes each including index entries for metadata parts of only a corresponding set of the documents; and
   the linking structure includes a single content-to-metadata linking structure containing the content-to-metadata entries for all the documents, and a plurality of metadata-to-content linking structures each containing the metadata-to-content links for only a corresponding set of the documents.

3. A computerized searchable repository according to claim 2, wherein the sets of documents are selected from local email files, share point files, file system files, hosted email files, hosted document management systems, databases, enterprise resource planning or customer relationship management systems, and instant messaging content.

4. A computerized searchable repository according to claim 2, wherein:
   each metadata-to-content linking structure is included in a respective one of the plurality of metadata indexes; and
   the content-to-metadata linking structure is separate from the content index so as to be updateable without requiring updating of the content index.

5. A computerized searchable repository according to claim 2, wherein the content-to-metadata linking structure is organized in a set-first manner to support searches limited in scope to one or more identified sets of the documents.

6. A computerized searchable repository according to claim 2, wherein the set of content parts required not to match the new content part includes the content parts of documents from multiple sets.

7. A computerized searchable repository according to claim 1, wherein the metadata part for each document includes information identifying how the document is structured from the content parts of the document.

8. A computerized searchable repository according to claim 7, wherein the information identifies whether a content part is a message body or an attachment and the order in which the attachments occur.

9. A computerized searchable repository according to claim 1, wherein the content part of at least some of the documents includes text and internal meta-data separate from the metadata part of the document, and wherein the content indexing includes examining only the text part of a content part to determine whether the content part is a new content part not matching any of the set of content parts already stored in the content store and indexed in the content index.

10. A computerized searchable repository according to claim 1, wherein the processor is further to perform a mixed-criteria search including metadata criteria as well as content criteria, the mixed-criteria search including selecting between a metadata-first strategy and a content-first strategy depending on an estimate of whether the metadata criteria or the content criteria is more selective.

11. A computerized searchable repository according to claim 1, wherein the processor is further to perform searching using query expansion, to separate out AND queries into separate queries on separate document parts and to perform an intersection on intermediate results internally to generate final search results.

12. A method of operating a computerized searchable repository for documents, each document having a structured metadata part and one or more unstructured content parts, comprising:
   storing the documents, a full text index and a linking structure in a storage sub-system of the computerized searchable repository, the content parts of the documents being stored in a single-instanced manner to avoid storing duplication of identical content parts, the full text index being usable for keyword searching of the documents and including a metadata index and a content index of the metadata and content parts respectively of the documents, the linking structure including metadata-to-content links and content-to-metadata linking entries, each metadata-to-content link linking a metadata part of a respective document to each content part of the document, each content-to-metadata linking entry having one or more content-to-metadata links collectively linking a respective content part to the metadata parts of a group of documents that each include the content part; and operating processing circuitry of the computerized searchable repository to perform full text indexing of the documents in the storage sub-system, the full text indexing of each document including metadata indexing a metadata part, conditionally content indexing a content part, and updating the linking structure, the content indexing being performed only if the content part is a new content part not matching any of at least a set of content parts already stored in a content store and indexed in the content index, each of the metadata indexing and content indexing including generating new index entries in the metadata or content index respectively for the metadata or content part respectively, each index entry associating a respective key word or key value with a corresponding one or more metadata or content parts containing the key word or key value, and the updating of the linking structure including generating new metadata-to-content and content-to-metadata links between the metadata part and either the new content part or an existing matching content part if present.

13. A method according to claim 12, wherein the documents are organized into sets in the storage sub-system, and wherein:

the content index is a single content index including index entries for content parts of all the documents, and the metadata index includes a plurality of metadata indexes each including index entries for metadata parts of only a corresponding set of the documents; and the linking structure includes a single content-to-metadata linking structure containing the content-to-metadata entries for all the documents, and a plurality of metadata-to-content linking structures each containing the metadata-to-content links for only a corresponding set of the documents.

14. A method according to claim 13, wherein the sets of documents are selected from local email files, share point files, file system files, hosted email files, hosted document management systems, databases, enterprise resource planning or customer relationship management systems, and instant messaging content.

15. A method according to claim 13, wherein:
each metadata-to-content linking structure is included in a respective one of the plurality of metadata indexes; and
the content-to-metadata linking structure is separate from the content index so as to be updateable without requiring updating of the content index.

16. A method according to claim 13, wherein the content-to-metadata linking structure is organized in a set-first manner to support searches limited in scope to one or more identified sets of the documents.

17. A method according to claim 12, wherein the set of content parts required not to match the new content part includes the content parts of documents from multiple sets.

18. A method according to claim 12, wherein the metadata part for each document includes information identifying how the document is structured from the content parts of the document.

19. A method according to claim 18, wherein the information identifies whether a content part is a message body or an attachment and the order in which the attachments occur.

20. A method according to claim 12, wherein the content part of at least some of the documents includes text and internal meta-data separate from the metadata part of the document, and wherein the content indexing includes examining only the text part of a content part to determine whether the content part is a new content part not matching any of the set of content parts already stored in the content store and indexed in the content index.

21. A method according to claim 12, wherein operating the processing circuitry further includes performing a mixed-criteria search including metadata criteria as well as content criteria, the mixed-criteria search including selecting between a metadata-first strategy and a content-first strategy depending on an estimate of whether the metadata criteria or the content criteria is more selective.

22. A method according to claim 12, wherein operating the processing circuitry further includes performing searching using query expansion, separating out AND queries into separate queries on separate document parts and performing an intersection on intermediate results internally to generate final search results.

* * * * *